(12) United States Patent
Weh

(10) Patent No.: US 9,404,514 B2
(45) Date of Patent: Aug. 2, 2016

(54) HYDRAULIC BLOCK FOR A HYDRAULIC UNIT OF A SLIP-CONTROLLED HYDRAULIC VEHICLE BRAKE SYSTEM

(71) Applicant: Robert Bosch GmbH, Stuttgart (DE)

(72) Inventor: Andreas Weh, Sulzberg (DE)

(73) Assignee: Robert Bosch GmbH, Stuttgart (DE)

( * ) Notice: Subject to any disclaimer, the term of this patent is extended or adjusted under 35 U.S.C. 154(b) by 240 days.

(21) Appl. No.: 13/905,544

(22) Filed: May 30, 2013

(65) Prior Publication Data
US 2013/0319562 A1 Dec. 5, 2013

(30) Foreign Application Priority Data

May 31, 2012 (DE) .......................... 10 2012 209 218

(51) Int. Cl.
*B60T 8/36* (2006.01)
*F15B 13/08* (2006.01)

(52) U.S. Cl.
CPC ............ *F15B 13/0803* (2013.01); *B60T 8/368* (2013.01); *F15B 13/0814* (2013.01); *F15B 13/0871* (2013.01); *F15B 13/0892* (2013.01); *Y10T 137/87885* (2015.04)

(58) Field of Classification Search
CPC ....... B60T 8/368; B60T 8/363; B60T 8/3675; B60T 17/02; B60T 13/686
USPC ................................... 303/119.3, DIG. 10, 87
See application file for complete search history.

(56) References Cited

U.S. PATENT DOCUMENTS

| | | | | |
|---|---|---|---|---|
| 5,449,226 A | * | 9/1995 | Fujita et al. | 303/116.4 |
| 5,975,652 A | * | 11/1999 | Otto | 303/113.1 |
| 6,398,315 B1 | * | 6/2002 | Dinkel et al. | 303/113.1 |
| 7,144,091 B2 | * | 12/2006 | Inage et al. | 303/119.3 |
| 7,407,234 B1 | * | 8/2008 | McCormick | 303/119.3 |
| 2007/0040445 A1 | * | 2/2007 | Otto | 303/119.3 |
| 2007/0096553 A1 | * | 5/2007 | May et al. | 303/119.3 |
| 2008/0179944 A1 | * | 7/2008 | Spaeth | 303/113.1 |

FOREIGN PATENT DOCUMENTS

DE 102005047355 A1 * 4/2007
DE 10 2006 059 924 A1 6/2008

* cited by examiner

*Primary Examiner* — Anna Momper
*Assistant Examiner* — Stephen Bowes
(74) *Attorney, Agent, or Firm* — Maginot, Moore & Beck LLP

(57) ABSTRACT

A hydraulic block for a hydraulic unit of a slip-controlled hydraulic vehicle brake system includes a row of receptacles for brake pressure buildup valves and a row of receptacles for brake pressure reduction valves arranged parallel to the row of receptacles for the brake pressure buildup valves. The hydraulic block further includes installation spaces for damper chambers arranged between the receptacles for the brake pressure buildup valves and the brake pressure reduction valves to allow space-saving accommodation of damper chambers. The installation spaces emerge at longitudinal sides of the hydraulic block and run parallel to the rows of receptacles for the brake pressure buildup valves and the brake pressure reduction valves. The installation spaces for the damper chambers viewed from a front side are arranged below the receptacles for the brake pressure buildup valves and the brake pressure reduction valves, close to a rear side of the hydraulic block.

10 Claims, 3 Drawing Sheets

HYDRAULIC BLOCK FOR A HYDRAULIC UNIT OF A SLIP-CONTROLLED HYDRAULIC VEHICLE BRAKE SYSTEM

This application claims priority under 35 U.S.C. §119 to patent application no. DE 10 2012 209 218.8, filed on May 31, 2012 in Germany, the disclosure of which is incorporated herein by reference in its entirety.

BACKGROUND

The disclosure relates to a hydraulic block for a hydraulic unit of a slip-controlled hydraulic vehicle brake system.

Hydraulic blocks of this kind are known. They are typically low, cuboidal metal blocks for the installation of hydraulic components such as hydraulic pumps, solenoid valves, hydraulic accumulators and damper chambers of a slip-controlled vehicle brake system. The hydraulic blocks hold the hydraulic components mechanically and connect them hydraulically by means of connecting lines, which are typically drilled. A hydraulic block fitted with the hydraulic components forms a hydraulic unit and is the core of the slip control system. "Low" is intended to indicate that hydraulic blocks often have a thickness which is approximately one quarter to one third and seldom more than half the length and width. In plan view, the hydraulic blocks are rectangular and often approximately square. Normally, only hydraulic parts of the components are located in the hydraulic block. Electromechanical parts, such as coils and armatures of the solenoid valves, are set apart from the hydraulic blocks. An electric motor for driving the hydraulic pumps is likewise fixed to the outside of the hydraulic block.

A hydraulic block of this kind is known from German Offenlegungsschrift DE 10 2006 059 924 A1. The known hydraulic block has receptacles for brake pressure buildup valves and for brake pressure reduction valves. The receptacles for the brake pressure buildup valves are arranged adjacent to one another in a row in the hydraulic block. The receptacles for the brake pressure reduction valves are arranged in a further row parallel to the row of receptacles for the brake pressure buildup valves in the hydraulic block.

SUMMARY

The hydraulic block according to the disclosure has installation spaces for damper chambers, which are arranged in the hydraulic block between the rows of receptacles for the brake pressure buildup valves and the brake pressure reduction valves. The installation spaces for the damper chambers can be arranged between the receptacles for the brake pressure buildup valves and for the brake pressure reduction valves or, alternatively, at some other height or level in the hydraulic block. The installation spaces for the damper chambers are preferably arranged parallel to the rows in which the receptacles for the brake pressure buildup valves and for the brake pressure reduction valves extend, i.e. the installation spaces for the damper chambers are arranged in the hydraulic block at right angles to the receptacles for the brake pressure buildup valves and for the brake pressure reduction valves and emerge at narrow sides of the hydraulic block. Hydraulically, the damper chambers are connected to discharge sides of hydraulic pumps of a slip control system of a vehicle brake system and damp pressure pulsations of the hydraulic pumps, which are often referred to as return pumps.

The advantage of the disclosure is space-saving accommodation of the damper chambers in the hydraulic unit.

The dependent claims relate to advantageous embodiments and developments of the disclosure.

BRIEF DESCRIPTION OF THE DRAWINGS

The disclosure is explained in greater detail below by means of an illustrative embodiment. In the drawing.

The hydraulic block is depicted as transparent in order to show the bores thereof. The drawings are to be taken as schematized and simplified representations to aid understanding and to elucidate the disclosure.

DETAILED DESCRIPTION

Figure 1:
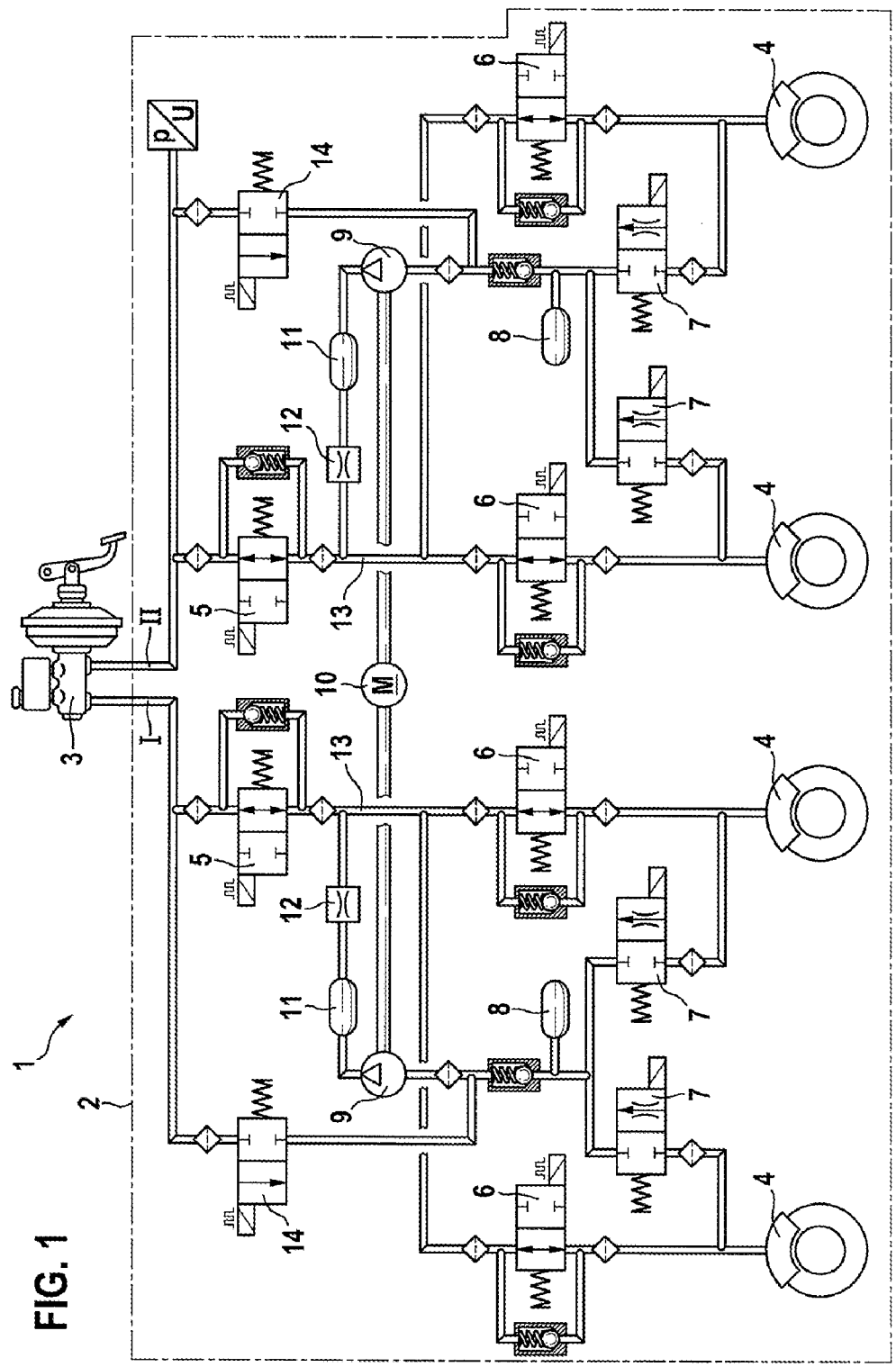
FIG. 1 shows a hydraulic circuit diagram of a slip-controlled hydraulic vehicle brake system.

The slip-controlled hydraulic dual circuit vehicle brake system 1 shown in FIG. 1 has a hydraulic unit 2, a dual circuit brake master cylinder 3, to which the hydraulic unit 2 is connected, and wheel brakes 4, which are connected to the hydraulic unit 2. The hydraulic unit 2 comprises the hydraulic components of a slip control system of the vehicle brake system 1 which are presented in the following paragraph.

Each brake circuit I, II of the vehicle brake system 1 is connected to the brake master cylinder 3 via an isolating valve 5. The wheel brakes 4 are connected to the isolating valves 5 via brake pressure buildup valves 6. A hydraulic accumulator 8 and a suction side of a hydraulic pump 9 are connected to the wheel brakes 4 in each brake circuit I, II via brake pressure reduction valves 7. The two hydraulic pumps 9, which are often also referred to as return pumps, are driven jointly by an electric motor 10. Connected to the discharge sides of the hydraulic pumps are damper chambers 11, which are connected by restrictors 12 to connecting lines 13 that connect the isolating valves 5 and the brake pressure buildup valves 6. Moreover, the vehicle brake system 1 has an intake valve 14 in each brake circuit I, II, said intake valve connecting the suction sides of the hydraulic pumps 9 to the brake master cylinder 3. The construction and operation of such slip-controlled vehicle brake systems 1 are known and will not be explained specifically here.

Figure 2:
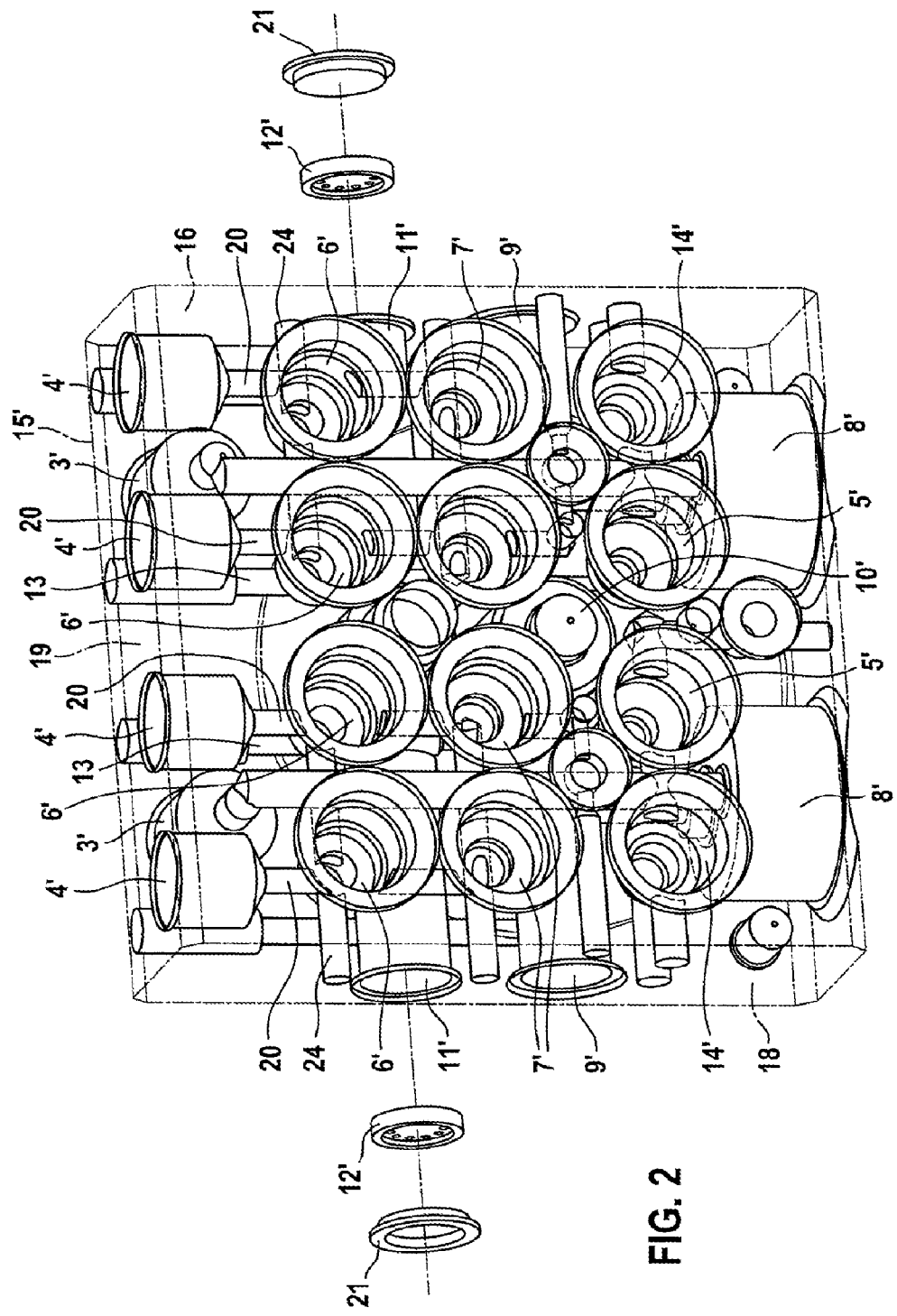
FIG. 2 shows a perspective front view of a hydraulic block according to the disclosure.
Figure 3:
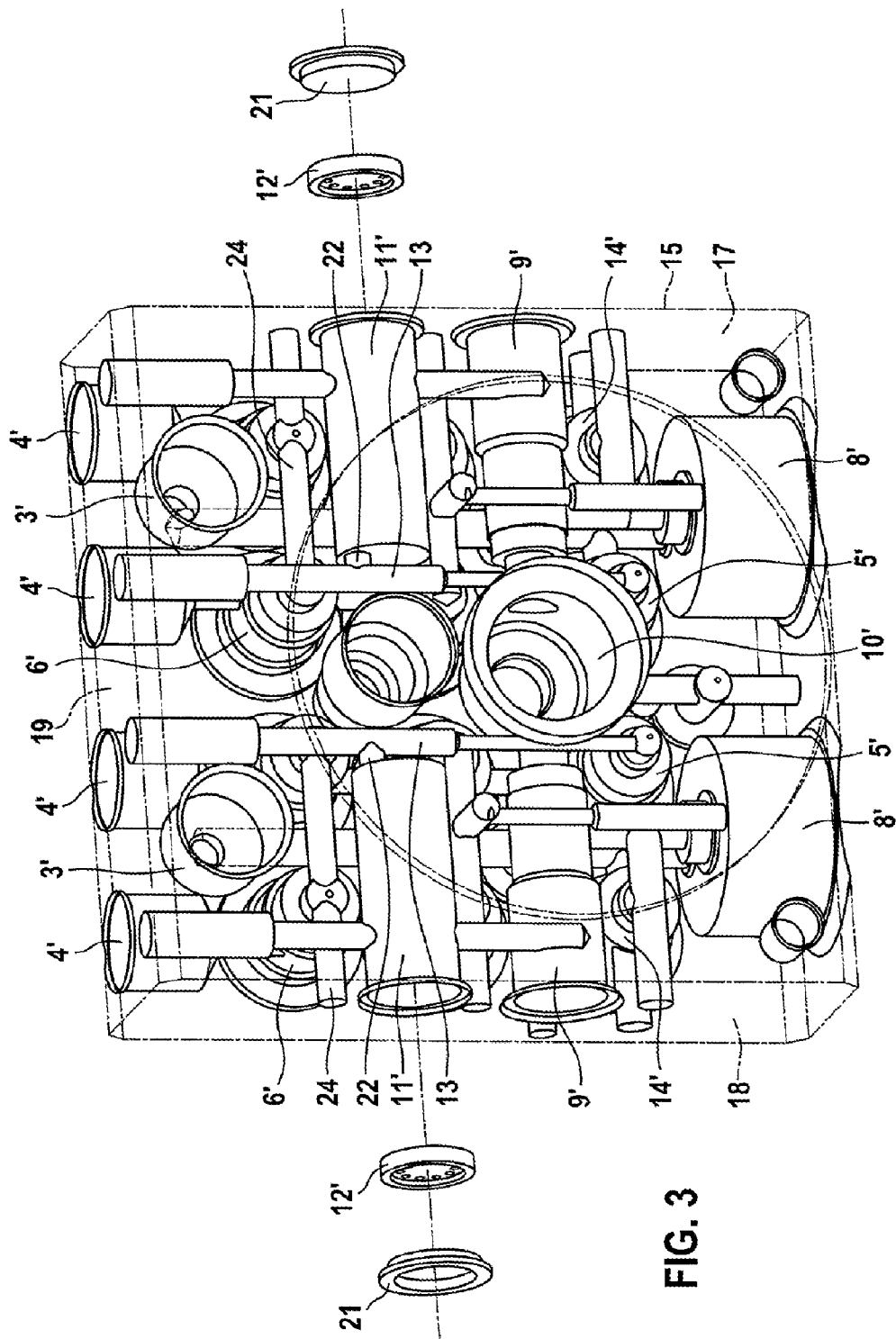
FIG. 3 shows a perspective rear view of the hydraulic block in FIG. 2.

The hydraulic components of the hydraulic unit 2 of the slip control system of the vehicle brake system 1 are accommodated in a hydraulic block 15, which is shown in FIGS. 2 and 3. The hydraulic block 15 is used for the mechanical fixing and hydraulic interconnection of the hydraulic components of the hydraulic unit 2 and of the slip control system of the vehicle brake system 1. Hydraulic parts of the components are located in receptacles, installation spaces and the like in the hydraulic block, while electrotechnical and electromechanical parts, such as coils and armatures of the solenoid valves, are set apart from the hydraulic block 15, on the outside. The electric motor 10 for driving the hydraulic pumps 9 is fixed on the outside of the hydraulic block 15. The hydraulic block 15 is shown without fittings, i.e. without the hydraulic components. The receptacles are cylindrical bores, some of stepped diameter, in the hydraulic block 15, and bores are formed as connecting lines or, more generally, as lines in the hydraulic block 15 to allow hydraulic interconnection. The receptacles and lines are arranged parallel or at right angles to one another and to edges and outer surfaces of the hydraulic block 15, i.e. in a Cartesian coordinate system. The hydraulic block 15 is of low, cuboidal design, its thickness being approximately one quarter of its length or width, and it is virtually square in elevation. For the purpose of unambiguous designation and differentiation, the flat side of the hydraulic block 15 which can be seen in FIG. 2 is referred to as the front side 16, the flat side which can be seen in FIG. 3 is referred to as the rear side 17, and the side faces are referred to as longitudinal sides 18 and transverse sides 19. The hydraulic block 15 is mirror-symmetrical with respect to an imaginary longitudinal center plane.

On one transverse side 19, the hydraulic block 15 has four connections 4' for the wheel brakes 4, which are arranged adjacent to one another in a row. In the illustrative embodiment, "in a row" means that the connections 4' etc. are arranged adjacent to one another on an imaginary straight line. The connections 4' are cylindrical blind holes, from which at least one line 20 leads to other connections, receptacles for solenoid valves, installation spaces for hydraulic pumps, hydraulic accumulators and/or damper chambers. The lines are bores in the hydraulic block 15 which, when they do not start from a connection, a receptacle or installation space, are hermetically sealed at a mouth on one of the sides 16, 17, 18, 19 of the hydraulic block 15, e.g. by means of a press-fitted ball. The connections 4' can have internal threads for connecting wheel brake lines or can be provided for staking, e.g. crimping for connection of the wheel brake lines. "Arranged on the transverse side 19 of the hydraulic block 15" means that the connections 4' on this transverse side 19 are open, thus allowing the wheel brake lines to be connected. In the case of the installation spaces for the hydraulic pumps and hydraulic accumulators, "arranged on one side of the hydraulic block 15" means that the installation spaces are open on this side of the hydraulic block 15, allowing the hydraulic pumps or hydraulic accumulators to be inserted or installed from this side. Corresponding statements apply to the receptacles of the solenoid valves. There are two connections 3' for the two brake circuits I, II of the brake master cylinder 3 on the rear side 17 of the hydraulic block 15 at a distance from the transverse side 19 of the hydraulic block 15 which corresponds approximately to a depth of the connections 4' for the wheel brakes 4. The connections 3' for the brake master cylinder 3 are each arranged between an outer and an inner connection 4' for the wheel brakes 4.

Four receptacles 6' for the brake pressure buildup valves 6 are arranged adjacent to one another in a row on the front side 16 of the hydraulic block 15, adjoining the connections 3' for the brake master cylinder 3. The receptacles 6' for the brake pressure buildup valves 6 are connected by the abovementioned lines 20 to the connections 4' for the wheel brakes 4.

Connections 7' for the brake pressure reduction valves 7 are arranged adjacent to one another on the front side 16 of the hydraulic block 15, in a further row parallel to the receptacles 6' for the brake pressure buildup valves 6, on an opposite side of the connections 6' for the brake pressure buildup valves 6 from the connections 4' for the wheel brakes 4.

Adjoining the receptacles 7' for the brake pressure reduction valves 7 are installation spaces 9' for the hydraulic pumps 9, these installation spaces being arranged, i.e. being open, on longitudinal sides 18 of the hydraulic block 15 and extending parallel to the rows of adjacently arranged receptacles 6', 7' for the brake pressure buildup valves 6 and the brake pressure reduction valves 7. The installation spaces 9' for the hydraulic pumps 9 extend relatively deep into the hydraulic block 15 and, after two diameter steps that reduce the diameter thereof, open radially into an eccentric space 10' for a pump eccentric (not shown here), which is arranged for conjoint rotation on a shaft of the electric motor 10 and drives the hydraulic pumps 9, which are designed as piston pumps. The eccentric space 10' is open on the rear side 17 of the hydraulic block 15 and is situated centrally between the installation spaces 9' for the hydraulic pumps 9. The electric motor 10 (not shown) is fixed externally on the rear side 17 of the hydraulic block 15, coaxially with the eccentric space 10'.

In a further row, parallel to the rows of receptacles 6', 7' for the brake pressure buildup valves 6 and for the brake pressure reduction valves 7, four receptacles 5', 14' for the isolating valves 5 and the intake valves 14 are arranged adjacent to one another on the front side 16 of the hydraulic block 15, on an opposite side of the installation spaces 9' for the hydraulic pumps 9 from the receptacles 6', 7' for the brake pressure buildup valves 6 and brake pressure reduction valves 7. The receptacles 5' for the isolating valves 5 are arranged between the receptacles 14' for the intake valves 14.

Two installation spaces 8' for the hydraulic accumulators 8 adjoin the row of receptacles 5', 14' for the isolating valves 5 and the intake valves 14. The installation spaces 8' are arranged on a transverse side of the hydraulic block 15 lying opposite the transverse side 19 on which the connections 4' for the wheel brakes 4 are arranged.

Two installation spaces 11' for the damper chambers 11 are arranged between the two rows of receptacles 6', 7' for the brake pressure buildup valves 6 and the brake pressure reduction valves 7. The installation spaces 11' for the damper chambers 11 are arranged on the longitudinal sides 18 of the hydraulic block 15, i.e. they are open there for the installation of the damper chambers 11, and they extend parallel to the rows of installation spaces 6', 7' for the brake pressure buildup valves 6 and the brake pressure reduction valves 7. As stated, the receptacles 6', 7' for the brake pressure buildup valves 6 and the brake pressure reduction valves 7 are arranged on the front side 16 of the hydraulic block 15. The installation spaces 11' for the damper chambers 11 are arranged in the hydraulic block 15 close to the rear side 17 of the hydraulic block 15, i.e. below the receptacles 6', 7' for the brake pressure buildup valves 6 and the brake pressure reduction valves 7, as viewed from the upper side 16 of the hydraulic block 15.

Washers 12' provided with holes, which form the restrictors 12, are inserted into the installation spaces 11' for the damper chambers 11. The installation spaces 11' for the damper chambers 11 are closed in a hermetically sealed and pressure tight manner by means of covers 21 which are inserted into the mouths of the installation spaces 11' for the damper chambers 11 and are welded, e.g. ultrasonically welded, or staked. In terms of hydraulics, the washers 12' that form the restrictors 12 are situated between the hydraulic accumulators 11 on one side and the isolating valves 5 and the brake pressure buildup valves 6 on the other side of the washers 12'.

At the base thereof, the installation spaces 11' for the damper chambers 11 are connected, by short connection lines 22 axially parallel to the installation spaces 11', to the connecting lines 13 (see FIG. 3), which connect the receptacles 5' for the isolating valves 5 to the internally arranged receptacles 6' for the brake pressure buildup valves 6. The externally arranged receptacles 6' for the other two brake pressure buildup valves 6 are connected by transverse bores 24 to the internally arranged receptacles 6' for the brake pressure buildup valves 6. The lines 13 run parallel to the longitudinal sides 18 of the hydraulic block 15 and perpendicular to the installation spaces 9' for the hydraulic pumps 9 and the installation spaces 11' for the damper chambers 11. The lines 13 end at the narrow side 19, on which the connections 4' for the wheel brakes 4 are arranged, and are closed in a pressure tight and hermetically sealed manner there by means of press-fitted balls (not shown). As stated, the connection lines 22 of the installation spaces 11' for the throttling chambers 11 to the connecting lines 13 are arranged axially parallel to the installation spaces 11' and eccentrically at one point on a circumference of the installation spaces 11' which faces the transverse side 19 of the hydraulic block 15, on which the connections 4' for the wheel brakes 4 are arranged. This allows or simplifies bleeding during the filling with brake fluid of the fully assembled hydraulic block 15, i.e. the hydraulic block 15 fitted with the hydraulic components of the slip control system of the vehicle brake system 1.

The damper chambers 11 can be accommodated in a space-saving manner in the hydraulic block 15 through arrangement of the installation spaces 11' for the damper chambers 11 between the receptacles 6' for the brake pressure buildup valves 6 and the receptacles 7' for the brake pressure reduction valves 7.

The hydraulic block 15 is bored in a Cartesian pattern, i.e. the receptacles, installation spaces and lines are bored parallel or at right angles to one another and to the sides of the hydraulic block 15.

What is claimed is:

1. A slip-controlled hydraulic vehicle brake system comprising:
   a plurality of brake pressure buildup valves;
   a plurality of brake pressure reduction valves;
   a plurality of damper chambers;
   a hydraulic block comprising:
      a body;
      a plurality of first receptacles defined in the body and arranged adjacent to one another in a first row in the hydraulic block, one of the plurality of brake pressure buildup valves being arranged in each of the plurality of first receptacles;
      a plurality of second receptacles defined in the body and arranged in a second row in the hydraulic block parallel to the first row, one of the plurality of brake pressure reduction valves being arranged in each of the plurality of second receptacles;
      a plurality of installation spaces defined in the body and arranged at least partially in the hydraulic block in a region located between the first receptacles and the second receptacles, one of the plurality of damper chambers being arranged in each of the plurality of installation spaces; and
      connection lines connecting each of the installation spaces to one or more of (i) a third receptacle formed in the body in which an isolating valve is positioned and (ii) one of the first receptacles;
   wherein the hydraulic block includes front and rear sides and narrow sides, and
   wherein the connection lines are all defined parallel to or perpendicular to a central axis of the installation space for the damper chamber.

2. The brake system according to claim 1, wherein the central axes of the installation spaces are arranged parallel to the row of the first receptacles and the row of the second receptacles.

3. The brake system according to claim 1, further comprising:
   restrictors positioned in the installation spaces for the damper chambers, the restrictors being designed in the form of cupped washers defining at least one opening for brake fluid.

4. The brake system according to claim 1, wherein the first receptacles are all formed such that first receptacle central axes of the first receptacles are in a straight line along the first row.

5. The brake system according to claim 1, wherein the second receptacles are all formed such that second receptacle central axes of the second receptacles are in a straight line along the second row.

6. The brake system according to claim 1, further comprising:
   a first hydraulic pump; and
   a second hydraulic pump, wherein:
      the hydraulic block includes a first pump installation space defined in the body at a first narrow side of the narrow sides, the first hydraulic pump being arranged in the first pump installation space,
      the hydraulic block includes a second pump installation space defined in the body at a second narrow side of the narrow sides, the second hydraulic pump being arranged in the second pump installation space,
      a first installation space of the installation spaces for the damper chambers is defined in the first narrow side of the body, and
      a second installation space of the installation spaces for the damper chambers is defined in the second narrow side of the body.

7. The brake system according to claim 1, wherein the connecting lines connect the installation spaces to the first receptacles and the third receptacles.

8. The brake system according to claim 1, wherein each of the connection lines opens into the installation space for the damper chamber at a point facing one of the narrow sides of the hydraulic block.

9. The brake system according to claim 1, wherein the connection lines open at a first narrow side of the narrow sides of the hydraulic block or open into a connecting line leading to the first narrow side of the hydraulic block.

10. The brake system according to claim 9, further comprising:
    wheel brakes,
    wherein the hydraulic block includes wheel brake connections in the first narrow side of the hydraulic block that connect to the wheel brakes.

* * * * *